Patented Aug. 16, 1927.

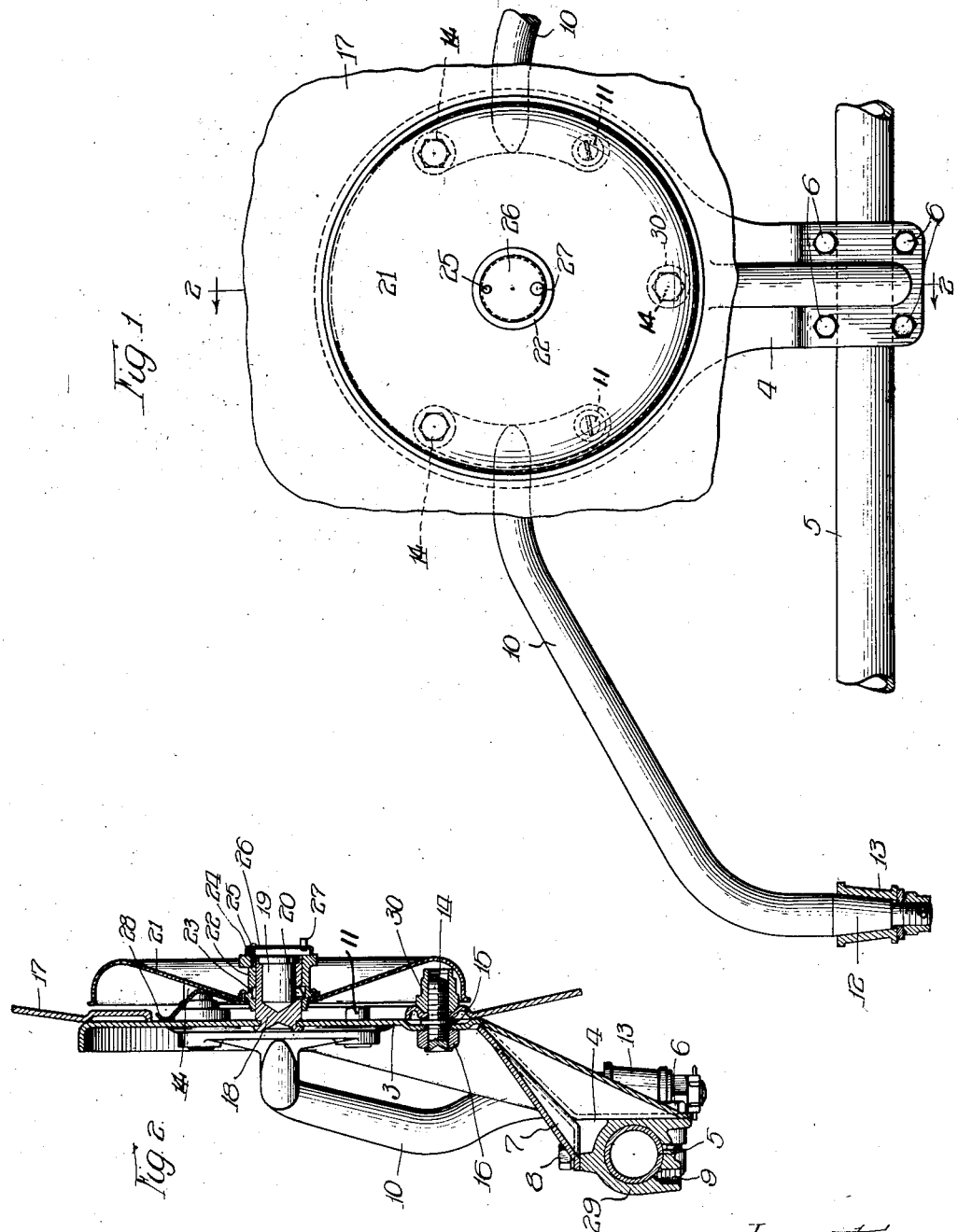

1,639,069

UNITED STATES PATENT OFFICE.

CHILDE HAROLD WILLS, OF MARYSVILLE, MICHIGAN.

SPARE-WHEEL LOCK.

Application filed December 13, 1920. Serial No. 430,152.

This invention relates to a new and improved spare wheel carrier and lock adapted for use with motor vehicles, and more particularly to a lock of the type adapted to enclose the usual spare wheel securing means and to prevent their unauthorized manipulation.

Thefts of spare wheels from motor vehicles have rendered necessary some form of locking means adapted to prevent their removal. Improvised locking means which comprise simply chains or bars adapted to secure the wheel to its support are easily broken by thieves. The locking means to be effective should fully protect the means securing the wheel to its supporting bracket in such manner as to prevent unfastening this means.

An object of the present invention is to provide locking means associated with the spare wheel support and entirely enclosing the means provided for securing the spare wheel to the support.

It is a further object to provide means of this character which is simple in construction and which may be readily removed and applied.

Other and further objects will appear as the description proceeds.

I have illustrated a preferred embodiment of my invention in the accompanying drawings, in which—

Figure 1 is a face view showing the spare wheel support with my locking means in place thereon; and Figure 2 is a vertical section taken through Figure 1 on line 2—2.

The vehicle support comprises the disk 3, which is carried by the downwardly extending flange 4. This flange is secured by bolts 6 to the clamp member 29 which encircles the cross-member 5. The flange 4 is braced by the member 7 shown in Figure 2, this member 7 being secured in place by the bolts 8. The set screw 9 tends to prevent the flange 4 working loose upon the bar 5.

The lateral supports 10 are bolted to the disk 3 at 11 and have tapered portions 12 interfitting in sockets 13 in fixed portions of the vehicle frame. These lateral supports, together with the lower supporting flange 4, retain the wheel-receiving disk 3 rigidly in place.

The disk 3 is provided with a plurality of spaced studs 14. These studs have a flnage 15 which bears against the forward face of the disk 3, and the rearwardly extending portion of the studs has the nut 16 screwed tightly thereon against the rear face of the disk. The end of the bolt 14 is countersunk and upset to prevent removal of the nut 16. As shown in the drawings, two of the studs 14 aid in securing the supports 10 to the disk 3.

In locking a wheel upon this support, the disk wheel 17 is moved adjacent the disk 3, its securing openings interfitting with the studs 14. The nuts 30 are then screwed in place, thus securing the wheel rigidly to the carrier disk. These nuts, as shown, are adapted for use with socket wrenches. The plate 3 is provided with the central hub 18 which is secured in place by swaging operation, as shown. This hub carries the lock 19, which latter is provided with the spring pressed bolt 20 having its face outwardly beveled.

The dished cover disk 21 is carried by the cover hub 22 which is adapted to fit around the fixed hub 18. This hub 22 is provided with an interior channel 23 adapted to coact with the bolt 20. The hub 22 carries the cover plate 24 pivoted thereto at 25, this plate being held against rattling by a spring 26 and being adapted to be swung to one side by means of the stud 27 to clear the key-hole in the lock. The outer edge of the cover 21 is bowed inwardly so as to inclose the nuts 30 and to come down adjacent the surface of the wheel 17. The disk 21 is provided with a plurality of spring fingers 28 which are adapted to contact with the plate 3.

In the operation of the device, the cover plate 24 is swung to one side and the key inserted in the lock 19 and the lock actuated to retract the bolt 20. The cover disk is thus released and the spring fingers 28 serve to carry it outwardly. The disk is removed and the wheel may then be removed by unscrewing the nuts 30. The bolt 20 of the lock 19 is normally spring pressed outwardly and the key may be removed from the lock as soon as the cover has been released and permitted to spring outwardly. When it is desired to replace the cover, it is simply thrust upon the fixed hub 18 and pushed inwardly against the resistance of the spring fingers 28 until the bolt 20 catches in the groove 23, when it is fully locked in place. The spring fingers 28 besides serving to facilitate the removal of the disk, have an important function in preventing lost motion between the parts, with its consequent rattling.

The device is simple in construction and may be readily removed and replaced, and yet serves to fully protect the wheel securing means and absolutely prevent their operation without removal of the cover disk.

I claim:

1. In combination, a support adapted to hold a spare vehicle wheel, studs extending from the support and adapted to pass through a portion of the wheel, nuts adapted to coact with the studs to retain the wheel in place, a dished disk adapted to enclose the nuts, a lock carried by the support and adapted to engage the disk to lock it in place upon the support, and a spring finger carried by the disk engaging the support and adapted to prevent rattling.

2. In combination, a support for a vehicle wheel, means for fastening the wheel to the support, a member adapted to cover the fastening means, means adapted to lock the cover in place, and means normally urging the cover from locked position.

3. In combination, a support adapted to hold a spare vehicle wheel, studs extending from the support and adapted to pass through a portion of the wheel, nuts adapted to coact with the studs to retain the wheel in place, a disk adapted to cover the nuts and having a lock seat therein, and a lock carried by a central hub extending from the support and having a bolt adapted to spring into the seat upon the disk when the latter is placed upon the hub.

4. In combination, a support adapted to hold a spare vehicle wheel, studs extending from the support and adapted to pass through a portion of the wheel, nuts adapted to coact with the studs to retain the wheel in place, a disk adapted to cover the nuts and having a lock seat therein, a lock carried by a central hub extending from the support and having a bolt adapted to spring into the seat upon the disk when the latter is placed upon the hub, and spring fingers carried by the disk and adapted to engage the support to urge the disk outwardly from locked position.

5. A spare wheel cover plate consisting of a cap adapted to hide from view the means whereby such a wheel is attached to an automobile and spring members on the inner side of said cap having a bearing adapted to normally urge the cover from the face of the wheel, when said cap is disposed adjacent the said wheel.

6. A spare wheel cover plate, consisting of a cap having an aperture therein adapted to register with a supporting member, and spring members on its inner side having a bearing adapted to urge the cover from the face of the wheel when said cap is disposed adjacent said wheel.

7. A device of the class described, comprising a supporting device, a disc wheel secured thereto near its hub, a support protruding through the center of said wheel and a cap member secured thereto adapted to hide said securing means from view, said cap having resilient members adapted to bear against said supporting device when said cap is disposed adjacent thereto.

8. A device of the class described, comprising arms supported on a vehicle and secured at their outer ends to a plate like member, a wheel bolted near its hub to said plate like member, a member secured near the center of said plate like member, and a cap member secured thereto adapted to hide said bolts from view, said cap having resilient members adapted to bear against said plate like member when said cap is disposed adjacent thereto.

Signed at Marysville, Michigan, this 8th day of December, 1920.

CHILDE HAROLD WILLS.